(12) United States Patent
Chinn et al.

(10) Patent No.: US 12,254,587 B2
(45) Date of Patent: Mar. 18, 2025

(54) PROTECTED ACCESS TO RENDERING INFORMATION FOR ELECTRONIC DEVICES

(71) Applicant: Apple Inc., Cupertino, CA (US)

(72) Inventors: Paul W. Chinn, San Jose, CA (US);
Karol B. Gasinski, Alameda, CA (US);
Nathaniel S. Brown, Seattle, WA (US);
Pau Sastre Miguel, San Francisco, CA (US); Pierre D'Herbemont, San Francisco, CA (US); Rohan Sehgal, San Jose, CA (US)

(73) Assignee: Apple Inc., Cupertino, CA (US)

( * ) Notice: Subject to any disclaimer, the term of this patent is extended or adjusted under 35 U.S.C. 154(b) by 64 days.

(21) Appl. No.: 17/947,069

(22) Filed: Sep. 16, 2022

(65) Prior Publication Data
US 2023/0094658 A1    Mar. 30, 2023

Related U.S. Application Data (60) Provisional application No. 63/248,413, filed on Sep. 24, 2021.

(51) Int. Cl.
*G06T 3/40* (2024.01)
*G06F 3/01* (2006.01)
(Continued)

(52) U.S. Cl.
CPC ............... *G06T 3/40* (2013.01); *G06F 3/013* (2013.01); *G06F 21/6218* (2013.01); *G06T 1/20* (2013.01); *G06T 1/60* (2013.01)

(58) Field of Classification Search
CPC ...... G06F 3/013; G06F 21/6218; G06F 3/011; G06F 21/6245; G06T 3/40; G06T 1/20; G06T 1/60
See application file for complete search history.

(56) References Cited

U.S. PATENT DOCUMENTS 7,065,651 B2 *  6/2006  Evans ..................... G06F 21/84
                                                    713/193
7,561,143 B1    7/2009  Milekic
(Continued)

FOREIGN PATENT DOCUMENTS

WO    WO 2019/245969    12/2019

OTHER PUBLICATIONS

Written Opinion of the International Preliminary Examining Authority from PCT/US2022/044294, dated Sep. 8, 2023, 9 pages.
(Continued)

*Primary Examiner* — Phi Hoang
(74) *Attorney, Agent, or Firm* — BAKERHOSTETLER (57) ABSTRACT

Aspects of the subject technology relate to electronic devices that can provide protected use of user-related information to applications, for generating user-specific outputs. The protected access may allow an application to process the user-related information within a processing environment of a processor that is separate from a primary processor of an electronic device. Within that processing environment, the application can utilize the user-related information to generate a user-specific output from the device. However, the application is prevented from extricating the user-related information, and information derived from the user-related information, from that processing environment.

21 Claims, 7 Drawing Sheets

(51) Int. Cl.
  *G06F 21/62* (2013.01)
  *G06T 1/20* (2006.01)
  *G06T 1/60* (2006.01)

(56) References Cited

U.S. PATENT DOCUMENTS

| | | | | |
|---|---|---|---|---|
| 8,085,275 | B1* | 12/2011 | Duluk, Jr. | G09G 5/39 |
| | | | | 345/565 |
| 8,271,746 | B1* | 9/2012 | Hutsell | G06F 13/1642 |
| | | | | 711/156 |
| 9,348,636 | B2* | 5/2016 | Khajuria | G06F 9/45558 |
| 9,665,740 | B1* | 5/2017 | Ostiguy | G06F 21/85 |
| 2016/0148000 | A1* | 5/2016 | Krutsch | G06V 10/50 |
| | | | | 380/28 |
| 2017/0256018 | A1* | 9/2017 | Gandhi | G06T 1/60 |
| 2018/0210840 | A1* | 7/2018 | Dong | G06F 9/455 |
| 2019/0035046 | A1 | 1/2019 | Backer et al. | |
| 2019/0035049 | A1* | 1/2019 | Backer | G06T 15/005 |
| 2020/0133878 | A1* | 4/2020 | Asaro | G06F 12/1081 |
| 2021/0027752 | A1 | 1/2021 | Holmes et al. | |
| 2022/0114284 | A1* | 4/2022 | Seetharamaiah | G06F 21/52 |

OTHER PUBLICATIONS

International Search Report and Written Opinion from PCT/US2022/044294, dated Dec. 16, 2022, 12 pages.
International Preliminary Report on Patentability from PCT/US2022/04494, dated Dec. 13, 2023, 28 pages.

\* cited by examiner

PROTECTED ACCESS TO RENDERING INFORMATION FOR ELECTRONIC DEVICES

CROSS REFERENCE TO RELATED APPLICATIONS

This application claims the benefit of priority to U.S. Provisional Patent Application No. 63/248,413, entitled, "Protected Access To Rendering Information For Electronic Devices", filed on Sep. 24, 2021, the disclosure of which is hereby incorporated herein in its entirety.

TECHNICAL FIELD

The present description relates generally to electronic devices, including, for example, protected access to rendering information for electronic devices.

BACKGROUND

Electronic devices often include applications that generate content to be displayed using a display of the electronic device.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Implementations of the subject technology described herein may provide protected access, by a first process such as an application, to rendering information that can be used by the first process for rendering display frames. For example, the rendering information may be, or may be based on, user information for which privacy protection is desired. In one or more implementations, the rendering information may be, for example, a resolution map generated by a system process of a device using gaze information for a user. The protected access provided by the subject technology may prevent the first process from exporting the rendering information, or information derived from the rendering information, from a protected processing environment. In this way, the first process can be allowed operate on the rendering information in the protected processing environment, such as to generate output for display, without allowing the first process to store, export, or otherwise extricate user-related information from the protected processing environment. Although user-related rendering information, used for rendering output for display, is described herein in connection with various examples, aspects of the subject technology may also be applied, as described herein, to provide protected access to other user-related data for generating device outputs other than display output.

Figure 1:
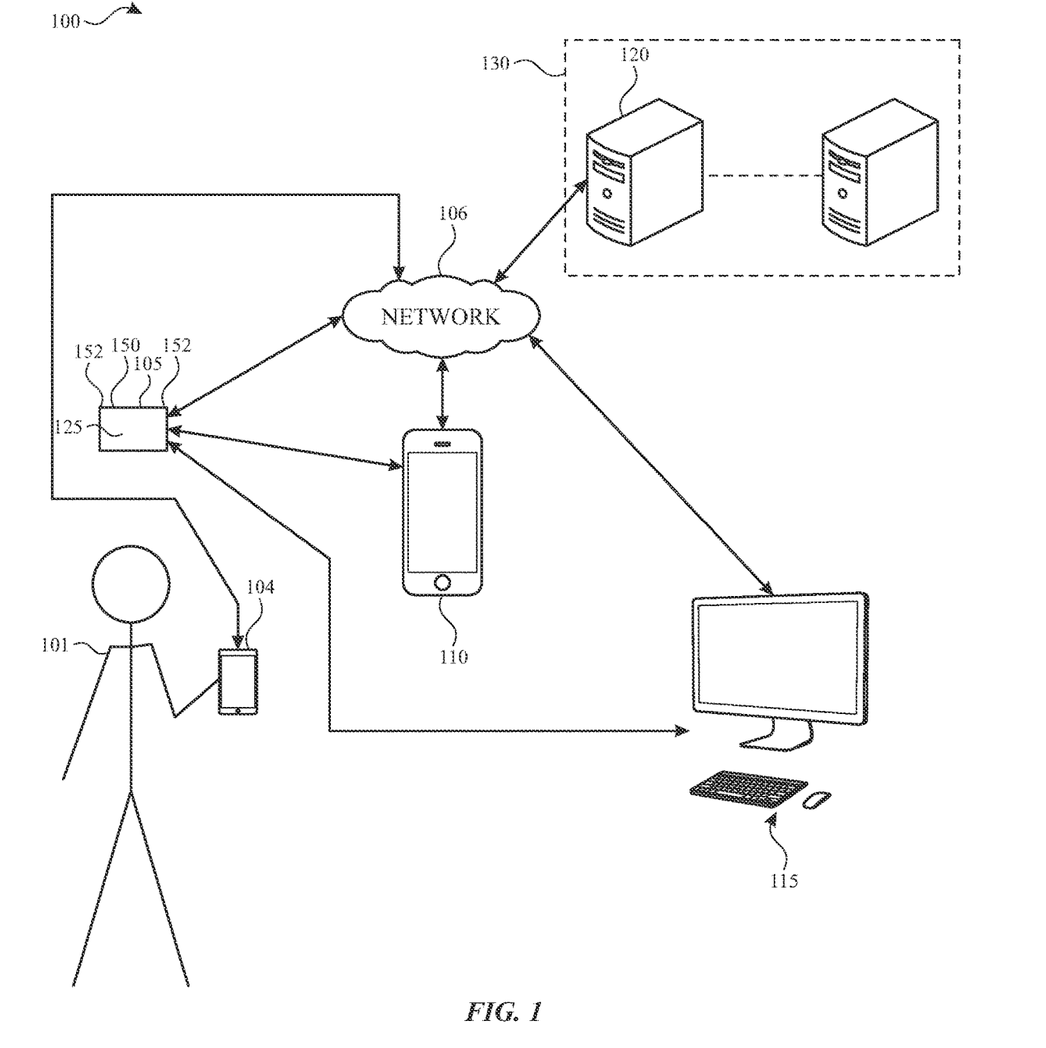
FIG. 1 illustrates an example system architecture including various electronic devices that may implement the subject technology in accordance with one or more implementations.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes an electronic device 105, an electronic device 110, an electronic device 115, and a server 120. For explanatory purposes, the system architecture 100 is illustrated in FIG. 1 as including the electronic device 105, the electronic device 110, the electronic device 115, and the server 120; however, the system architecture 100 may include any number of electronic devices and any number of servers or a data center including multiple servers.

The electronic device 105 may be smartphone, a tablet device, or a wearable device such as a head mountable portable system, that includes a display system capable of presenting a visualization of an extended reality environment or other display environment to a user (e.g., user 101). The electronic device 105 may be powered with a battery and/or any other power supply. In an example, the display system of the electronic device 105 provides a stereoscopic presentation of the extended reality environment, enabling a three-dimensional visual display of a rendering of a particular scene, to the user. In one or more implementations, instead of, or in addition to, utilizing the electronic device 105 to access an extended reality environment, the user may use a handheld electronic device 104, such as a tablet, watch, mobile device, and the like.

The electronic device 105 may include one or more cameras such as camera(s) 150 (e.g., visible light cameras, infrared cameras, eye tracking cameras, etc.) Further, the electronic device 105 may include various sensors such as sensor(s) 152 including, but not limited to, cameras, image sensors, touch sensors, microphones, inertial measurement units (IMU), heart rate sensors, temperature sensors, Lidar sensors, radar sensors, sonar sensors, GPS sensors, Wi-Fi sensors, near-field communications sensors, etc.) Moreover, the electronic device 105 may include hardware elements that can receive user input such as hardware buttons or switches. User input detected by such sensors and/or hardware elements correspond to various input modalities for initiating recording within a given extended reality environment. For example, such input modalities may include, but not limited to, facial tracking, eye tracking (e.g., gaze direction or gaze location tracking), hand tracking, gesture tracking, biometric readings (e.g., heart rate, pulse, pupil dilation, breath, temperature, electroencephalogram, olfactory), recognizing speech or audio (e.g., particular hotwords), and activating buttons or switches, etc. The electronic device 105 may also detect and/or classify physical objects in the physical environment of the electronic device 105.

The electronic device 105 may be communicatively coupled to a base device such as the electronic device 110 and/or the electronic device 115. Such a base device may, in general, include more computing resources and/or available power in comparison with the electronic device 105. In an example, the electronic device 105 may operate in various modes. For instance, the electronic device 105 can operate in a standalone mode independent of any base device. When the electronic device 105 operates in the standalone mode, the number of input modalities may be constrained by power limitations of the electronic device 105 such as available battery power of the device. In response to power limitations, the electronic device 105 may deactivate certain sensors within the device itself to preserve battery power.

The electronic device 105 may also operate in a wireless tethered mode (e.g., connected via a wireless connection with a base device), working in conjunction with a given base device. The electronic device 105 may also work in a connected mode where the electronic device 105 is physically connected to a base device (e.g., via a cable or some other physical connector) and may utilize power resources provided by the base device (e.g., where the base device is charging the electronic device 105 while physically connected).

When the electronic device 105 operates in the wireless tethered mode or the connected mode, a least a portion of processing user inputs and/or rendering the extended reality environment may be offloaded to the base device thereby reducing processing burdens on the electronic device 105. For instance, in an implementation, the electronic device 105 works in conjunction with the electronic device 110 or the electronic device 115 to generate an extended reality environment including physical and/or virtual objects that enables different forms of interaction (e.g., visual, auditory, and/or physical or tactile interaction) between the user and the extended reality environment in a real-time manner. In an example, the electronic device 105 provides a rendering of a scene corresponding to the extended reality environment that can be perceived by the user and interacted with in a real-time manner. Additionally, as part of presenting the rendered scene, the electronic device 105 may provide sound, and/or haptic or tactile feedback to the user. The content of a given rendered scene may be dependent on available processing capability, network availability and capacity, available battery power, and current system workload.

The electronic device 105 may also detect events that have occurred within the scene of the extended reality environment. Examples of such events include detecting a presence of a particular person, entity, or object in the scene. Detected physical objects may be classified by electronic device 105, electronic device 110, and/or electronic device 115 and the location, position, size, dimensions, shape, and/or other characteristics of the physical objects can be used to coordinate the rendering of virtual content, such as a UI of an application, for display within the XR environment.

The network 106 may communicatively (directly or indirectly) couple, for example, the electronic device 105, the electronic device 110 and/or the electronic device 115 with the server 120 and/or one or more electronic devices of one or more other users. In one or more implementations, the network 106 may be an interconnected network of devices that may include, or may be communicatively coupled to, the Internet.

The electronic device 110 may include a touchscreen and may be, for example, a smartphone that includes a touchscreen, a portable computing device such as a laptop computer that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 110 may not include a touchscreen but may support touchscreen-like gestures, such as in an extended reality environment. In one or more implementations, the electronic device 110 may include a touchpad. In FIG. 1, by way of example, the electronic device 110 is depicted as a mobile smartphone device with a touchscreen. In one or more implementations, the electronic device 110, the handheld electronic device 104, and/or the electronic device 105 may be, and/or may include all or part of, the electronic system discussed below with respect to FIG. 8. In one or more implementations, the electronic device 110 may be another device such as an Internet Protocol (IP) camera, a tablet, or a peripheral device such as an electronic stylus, etc.

The electronic device 115 may be, for example, a desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 8.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for rendering and generating content such as graphics, images, video, audio and multi-media files for extended reality environments. In an implementation, the server 120 may function as a cloud storage server that stores any of the aforementioned extended reality content generated by the above-discussed devices and/or the server 120.

Figure 2:
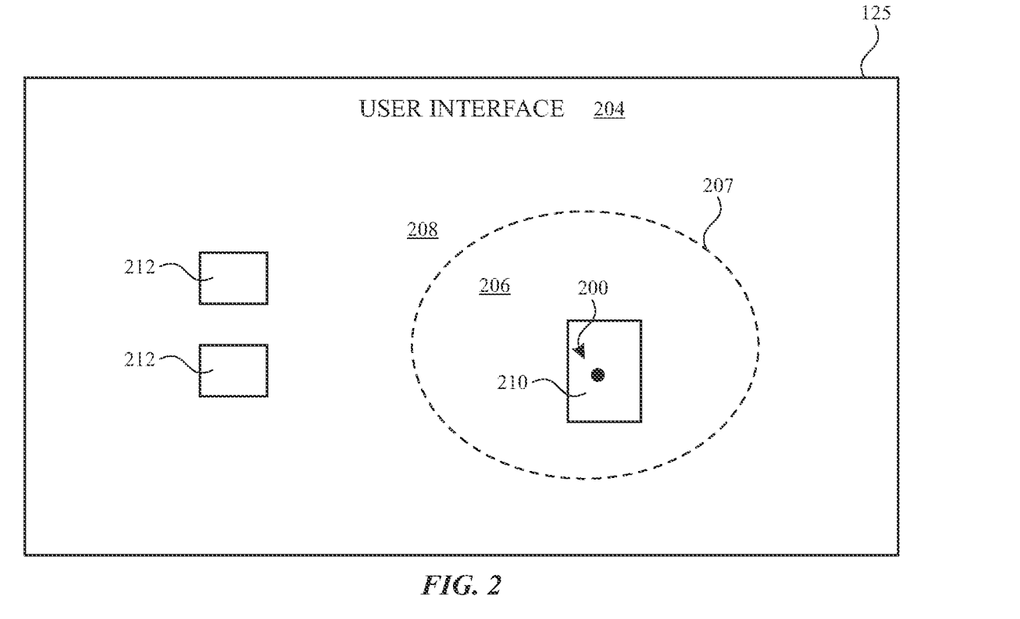
FIG. 2 illustrates example of display content that may be displayed a display of an electronic device in accordance with one or more implementations.

FIG. 2 illustrates an example display environment in which the display 125 displays a user interface (UI) 204 of an application running on the electronic device 105. In the example of FIG. 2, a rendered display frame fills the viewable area of the display 125 and includes the user interface 204. In the example of FIG. 2, UI 204 includes a UI element 210 and UI elements 212. UI elements 210 and 212 may correspond to, as illustrative examples, a sub-window of a UI window, static elements such as images, and/or dynamic elements such as video streams and/or virtual characters or other game or interactive elements.

In the example of FIG. 2, a user (e.g., user 101 of FIG. 1) of the electronic device 105 is gazing at a gaze location 200 on display 125. For example, images captured by camera(s) 150 and/or sensor data captured by sensor(s) 152, and corresponding to the user 101, may be used (e.g., by a system process at the electronic device 105) to determine the gaze location 200 (e.g., in terms of the coordinates of a pixel or group of pixels of the display 125). For example, the images may include optical and/or infrared images of one or both eyes of the user. In this example use case of FIG. 2, the gaze location 200 is within the boundary of the UI element 210.

In the example of FIG. 2, the display frame that is displayed on the display 125 is a foveated display frame in which a first portion 206 of the display frame that is within a predefined distance from the gaze location 200 (e.g., within a boundary 207) is displayed with a first resolution, and a second portion 208 of the display frame that is outside the predefined distance (e.g., outside the boundary 207) is displayed with a second, lower resolution. In this way, user information, such as the gaze location 200, can be used to save power and/or processing resources of the device, by allowing pixels in the second portion 208 to be rendered at a lower resolution, when the user is not gazing on that portion of the display. For explanatory purposes foveation is described herein with reference to the resolution of the content; however, the foveation may also be applicable to bit rate, compression, or any other encoding aspect/feature of the content.

In the example of FIG. 2, the boundary 207 is indicated by a dashed line. However, this is merely for ease of understanding and it is appreciated that the boundary 207 between the first portion 206 (e.g., the high resolution portion) and the second portion (e.g., the low resolution portion) of the display frame may be constructed so as to be imperceptible by the user. For example, the boundary 207 may have a radial or other width and may have a resolution that decreases across the width from the resolution of the first portion 206 (e.g., a resolution at an outer edge of the first portion 206) to the resolution of the second portion 208 (e.g., a resolution at an inner edge of the second portion 208), to create a smooth transition that is imperceptible by the user. Moreover, the boundary 207 of FIG. 2 is depicted as a round boundary, but may be implemented with other forms and/or shapes (e.g., the shape of the UI element 210) in various implementations. Further, the resolution of the first portion 206 and/or the resolution of the second portion 208 may also be varied as a function of distance from the gaze location 200 and/or as a function of the displayed content. Further, in the example of FIG. 2, the UI 204 occupies the entire viewable area of the display 125. However, it is appreciated that, in one or more use cases, the UI 204 may be displayed at a first location on the display while other display content (e.g., system content and/or display content from one or more other applications) is concurrently displayed at other locations on the display.

As the gaze location 200 moves on the display 125, the electronic device 105 may track and update the locations and/or shapes of the first portion 206 and the second portion 208 to continue to be substantially centered on the gaze location 200. As discussed herein, it may be desirable to allow the application to which the UI 204 corresponds to generate a user-specific output (e.g., a foveated display frame of the type shown in FIG. 2), without providing the application access to user-specific information such as the gaze location 200. For example, the user-specific information may include the gaze location 200 itself, image data and/or sensor data on which the gaze location or other user characteristics and/or behavior are based, and/or information derived from the gaze location, the image data, and/or the sensor data.

Aspects of the subject technology can provide this ability for applications to output application content based on user information, without providing the user information to the application and without providing the application with the ability to export, store, and/or otherwise output the user information or information based on the user information (e.g., other than directly to the display 125 or directly to another output component). For example, a system process at the electronic device 105 may generate rendering information, based on user information such as the gaze location 200, that can be provided to the application (e.g., in a protected manner as described in further detail hereinafter). The application can then use the rendering information to render application content which is therefore effectively rendered based on the user information.

Figure 3:
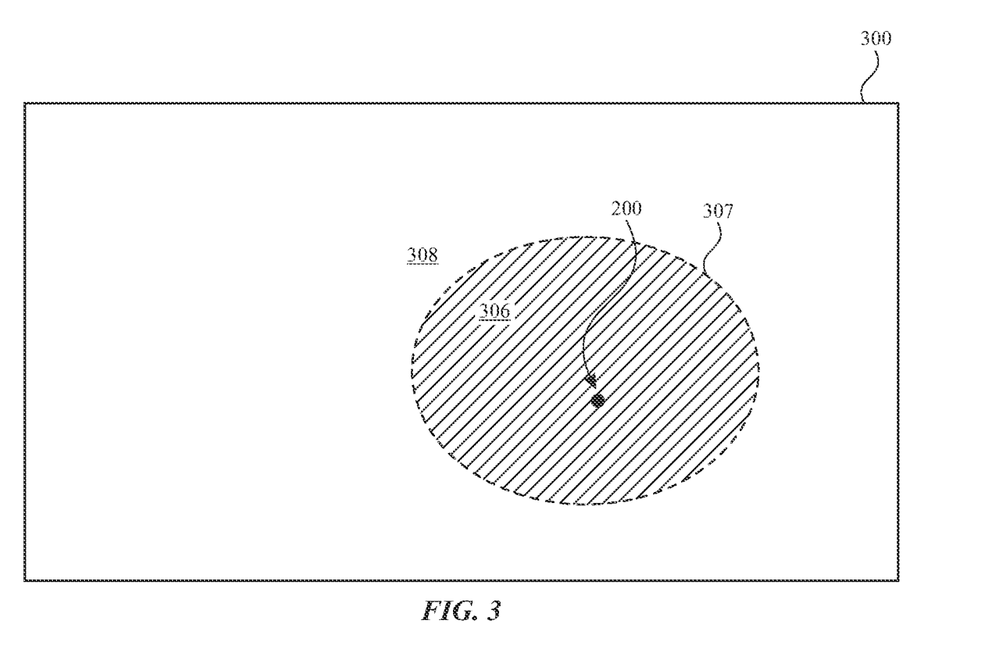
FIG. 3 illustrates example of rendering information that can be used for rendering the display content of FIG. 2 in accordance with one or more implementations.

For example, FIG. 3 illustrates one example of rendering information that can be used by an application to render the UI 204 of FIG. 2. In the example of FIG. 3, the rendering information is a resolution map 300 that has been generated based on the gaze location 200 of FIG. 2. In this example, the resolution map 300 is a foveation map that has a first portion 306 spatially corresponding to the first portion 206 of the display frame of FIG. 2 and a second portion 308 spatially corresponding to the second portion 208 of the display frame of FIG. 2, and separated by a boundary 307, spatially corresponding to the boundary 207 of FIG. 2. In this example, the resolution map 300 does not include any content for display, and instead provides a pixel resolution at each location in the map. An application may render application content (e.g., the UI 204 of FIG. 2) with a resolution as indicated based on the resolution map 300. For example, the resolution map 300 may be implemented as a variable rasterization rate (VRR) map, based upon which an application can render a display frame with higher pixel density in some areas (e.g., in areas of the display frame spatially corresponding to the first portion 306 of the resolution map 300), and relatively lower pixel density in other areas (e.g., in areas of the display frame spatially corresponding to the second portion 308 of the resolution map 300). The resolution map 300 is one example of resolution information that can be provided to a process such as an application for use in rendering, and other rendering information that is based on a user position or other user characteristic(s) and that can be used for rendering of application content is also contemplated.

As discussed herein, in one or more implementations, user-related information such as rendering information (e.g., resolution map 300) may be provided to an application in a protected manner (e.g., in a manner that prevents the application from storing or exporting the user-related information, the rendering information, and/or information derived from the user-related information and/or the rendering information).

Figure 4:
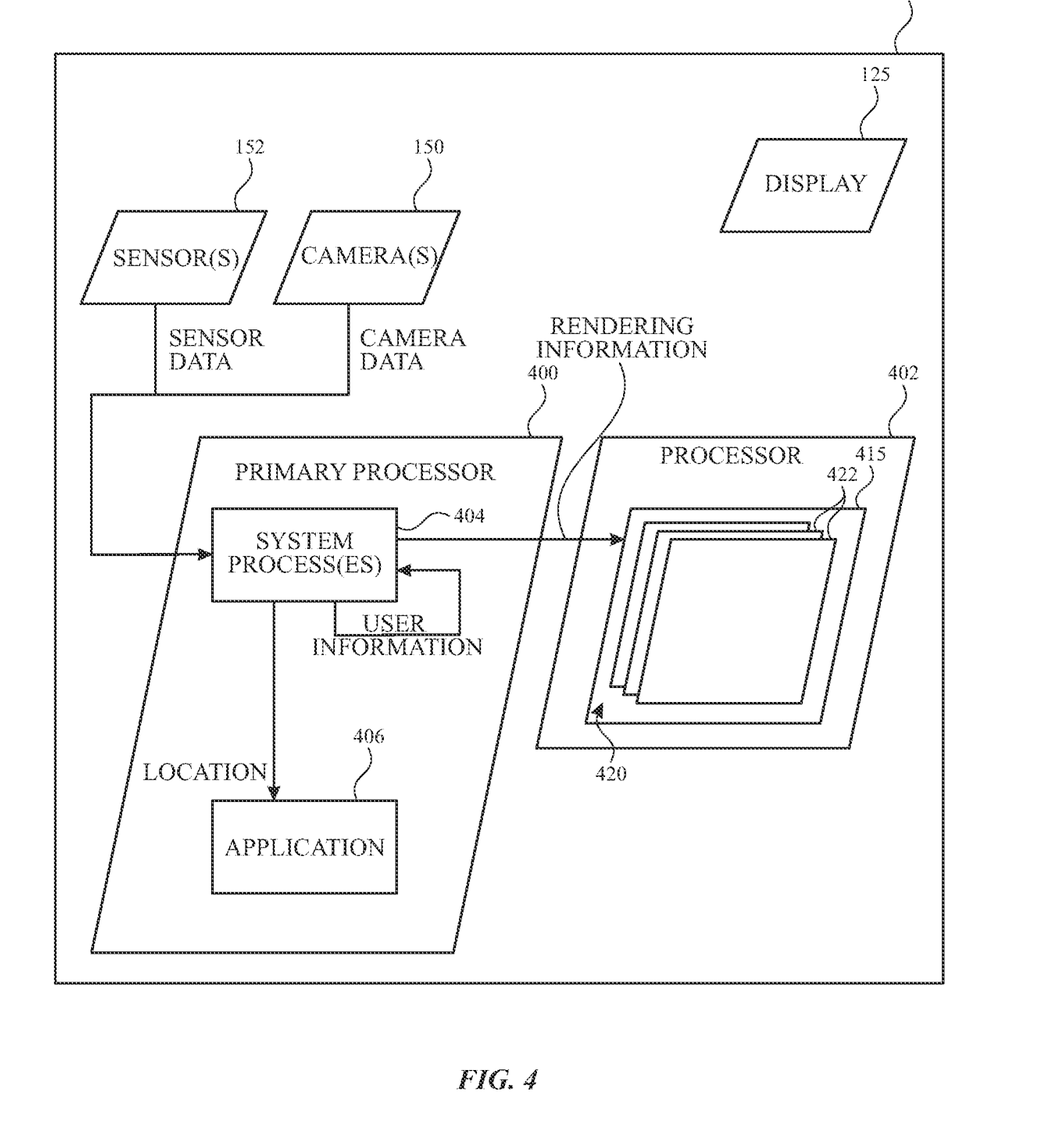
FIG. 4 illustrates an example architecture of an electronic that may implement aspects of the subject technology in accordance with one or more implementations.

For example, FIG. 4 illustrates an example architecture that may be implemented by the electronic device 105 in accordance with one or more implementations of the subject technology. For explanatory purposes, portions of the architecture of FIG. 4 are described as being implemented by the electronic device 105 of FIG. 1; however, appropriate portions of the architecture may be implemented by any other electronic device. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

Various portions of the architecture of FIG. 4 can be implemented in software or hardware, including by one or more processors and a memory device containing instructions, which when executed by the processor cause the processor to perform the operations described herein. For example, in FIG. 4, the trapezoidal boxes may indicate that the sensor(s) 152, the camera(s) 150, the primary processor 400, the processor 402, the memory 415, and the display 125 may be hardware components, and the rectangular boxes may indicate that an the system process(es) 404 and the application 406 may be implemented in software that is executed by the primary processor 400 and/or the processor 402. In one or more implementations, the primary processor 400 may be a central processing unit (CPU) and the processor 402 may be a separate co-processor such as graphics processing unit (GPU), a neural processor, a secure processor, or any other co-processor that allows the application 406 and/or the system process(es) 404 to write an instruction sequence to the memory of the processor 402, for execution by the processor 402 to generate a user-specific output (e.g., a rendered frame such a foveated frame, other display content that depends on the user's current position, motion, and/or perspective, spatial audio output, etc., and/or non-display output such as audio output or tactile output that depends on the user's current position, motion, and/or perspective, spatial audio output, etc.).

The example of FIG. 4 illustrates the electronic device 105 operating to generate rendering information based on user information, for use by a process such as an application. As shown, sensor data from sensor(s) 152 and/or camera data from camera(s) 150 may be provided to system process(es) 404 running on (e.g., being executed by) the primary processor 400. In one or more use cases, some or all of the sensor data from sensor(s) 152 and/or camera data from camera(s) 150 may represent user-specific data such as images and/or other measurements of user physical characteristics, movements, or the like. For example, the camera data may include one or more optical and/or infrared images of the user's eyes.

In the example of FIG. 4, the system process(es) 404 obtain user information. For example, the user information may be the sensor data and/or the camera data. In other examples, the user information may be derived from the sensor data and/or the camera data by the system process(es) 404. For example, the system process(es) 404 may determine a gaze location (e.g., the gaze location 200 of FIG. 2) from the sensor data and/or the camera data.

As shown in FIG. 4, the system process(es) 404 may generate rendering information based on the user information. As an example, the rendering information may include a resolution map, such as the resolution map 300 of FIG. 3, based on the user information (e.g., based on the gaze location 200). The system process(es) 404 may then provide the rendering information to the processor 402 for storage in memory 415 of the processor 402. In the example of FIG. 4, the memory 415 is depicted as physical memory of the processor 402 (e.g., on-chip memory on a separate chip from the primary processor 400 and/or dedicated off-chip memory such as dynamic random access memory (DRAM)). However, in other implementations, the memory 415 may be a protected portion of memory that is shared with the primary processor 400 (e.g., on-chip memory of a system-on-chip (SoC) that includes the primary processor 400, the processor 402, and the memory 415), the portion allocated (e.g., by a kernel process at the electronic device) as or as part of a processing environment for the processor 402. The system process(es) 404 may then provide a location of the rendering information in the memory 415 of the processor 402, to an application such as application 406 (e.g., an application having a UI such as the UI 204 of FIG. 2). As examples, the system process(es) 404 may receive the location from the processor 402 and provide the received location to the application 406, or the system process(es) 404 can define the location and provide the location to the application 406.

In one or more implementations, the system process(es) 404 may generate one or more buffers 422 (e.g., a pool 420 of buffers 422) in the memory 415 of the processor 402. For example, the pool 420 may include three buffers 422, four buffers 422, five buffers 422, or other number of buffers. The number of buffers may be based on application processing settings. For example, some applications may generate application content for some display frames that depend on the application content of other (e.g., prior or upcoming) display frames, and may utilize more than one buffer. In one or more implementations, the primary processor 400 may generate (e.g., allocate) the pool 420 of buffers 422 and provide pointers to the buffers 422 to the application 406. In these implementations, the primary processor 400 may then, on a per-frame basis, generate the rendering information (e.g., the resolution map 300), select a buffer 422 from the pool 420 of buffers 422, store the rendering information in the selected buffer 422, and provide an index of the selected buffer to the application (as the location of the memory in which the rendering information is stored).

Figure 5:
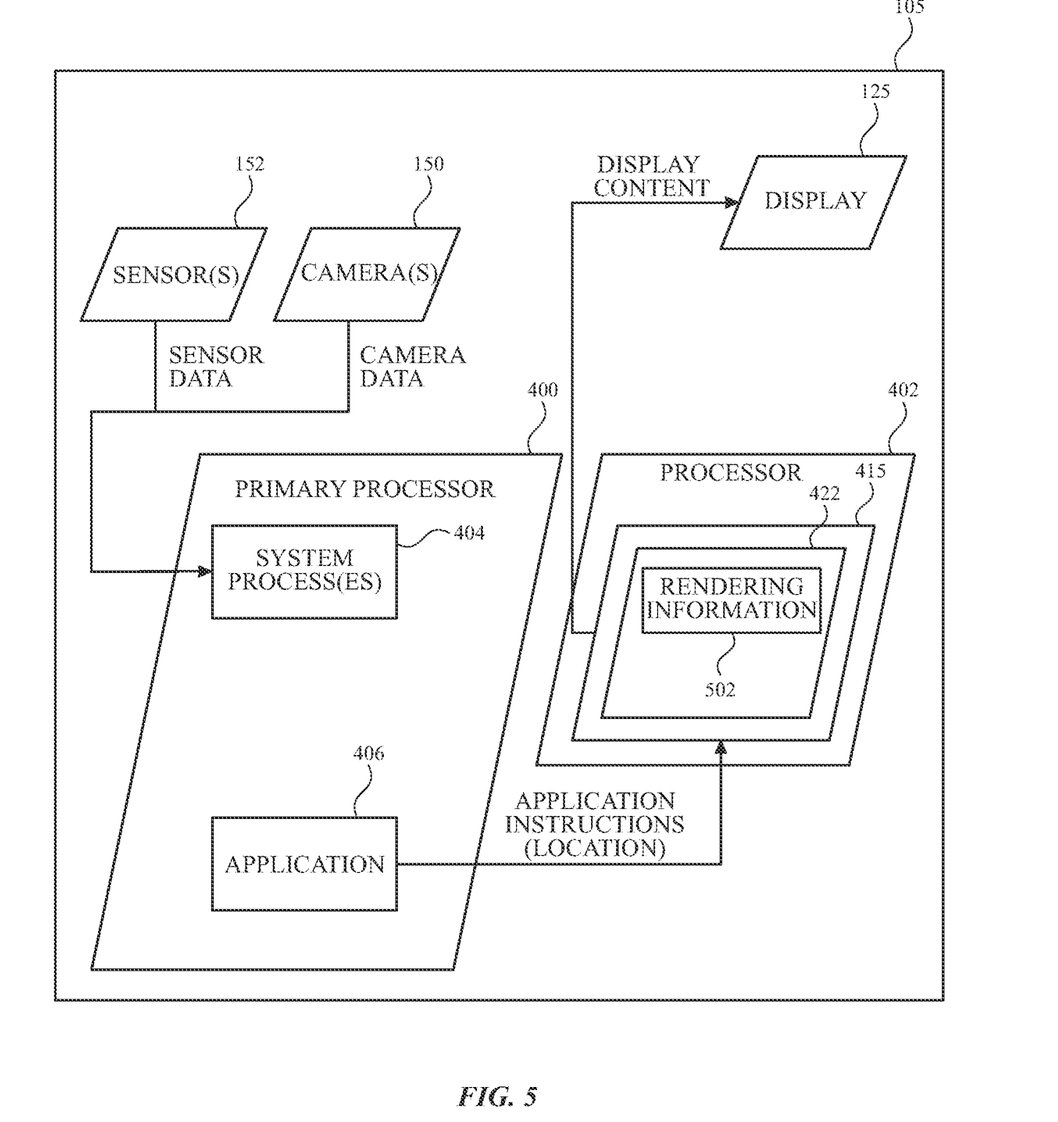
FIG. 5 illustrates an example in which an application in the architecture of FIG. 4 is operating to generate display content based on rendering information for which access is protected in accordance with one or more implementations.

FIG. 5 illustrates the example architecture of FIG. 4 for the electronic device 105, in an operating state in which the application 406 uses the rendering information, provided by the primary processor (e.g., by the system process(es) 404) to the processor 402, to generate display content. In the example of FIG. 5, the rendering information 502 provided by the system process(es) 404 has been stored in the memory 415 of the processor 402 (e.g., in a buffer 422).

As shown, the application 406 may provide application instructions (e.g., an instruction sequence) to the memory 415 of the processor 402, for execution within an processing environment of the processor 402 (e.g., a processing environment encompassing or associated with the memory 415). As shown, the application instructions may include the location of the rendering information 502 (e.g., the location of the memory, such as the buffer 422, in which the rendering information 502 is stored). For example, the application instructions, when executed by the processor 402 (within the processing environment of the processor 402) may access the rendering information 502 (from within the processing environment of the processor 402) using the location received from the system process(es) 404, and generate display content using the rendering information 502. As one illustrative example, the application instructions may include instructions which, when executed by the processor 402 (within the processing environment of the processor 402) cause the processor 402 to generate the foveated display frame of FIG. 2 using the resolution map 300 of FIG. 3), and provide the foveated display frame as display content for display by the display 125.

Because the application 406 can only access the rendering information 502 using the application instructions that are executed by the processor 402 within the processing environment of the processor 402, the rendering information 502, any user information on which the rendering information 502 is based, and any information derived from the rendering information 502 using the application instructions, can be prevented from being later accessed, stored, or exported by the application 406 and/or generally extracted from the processing environment of the processor 402.

Figure 6:
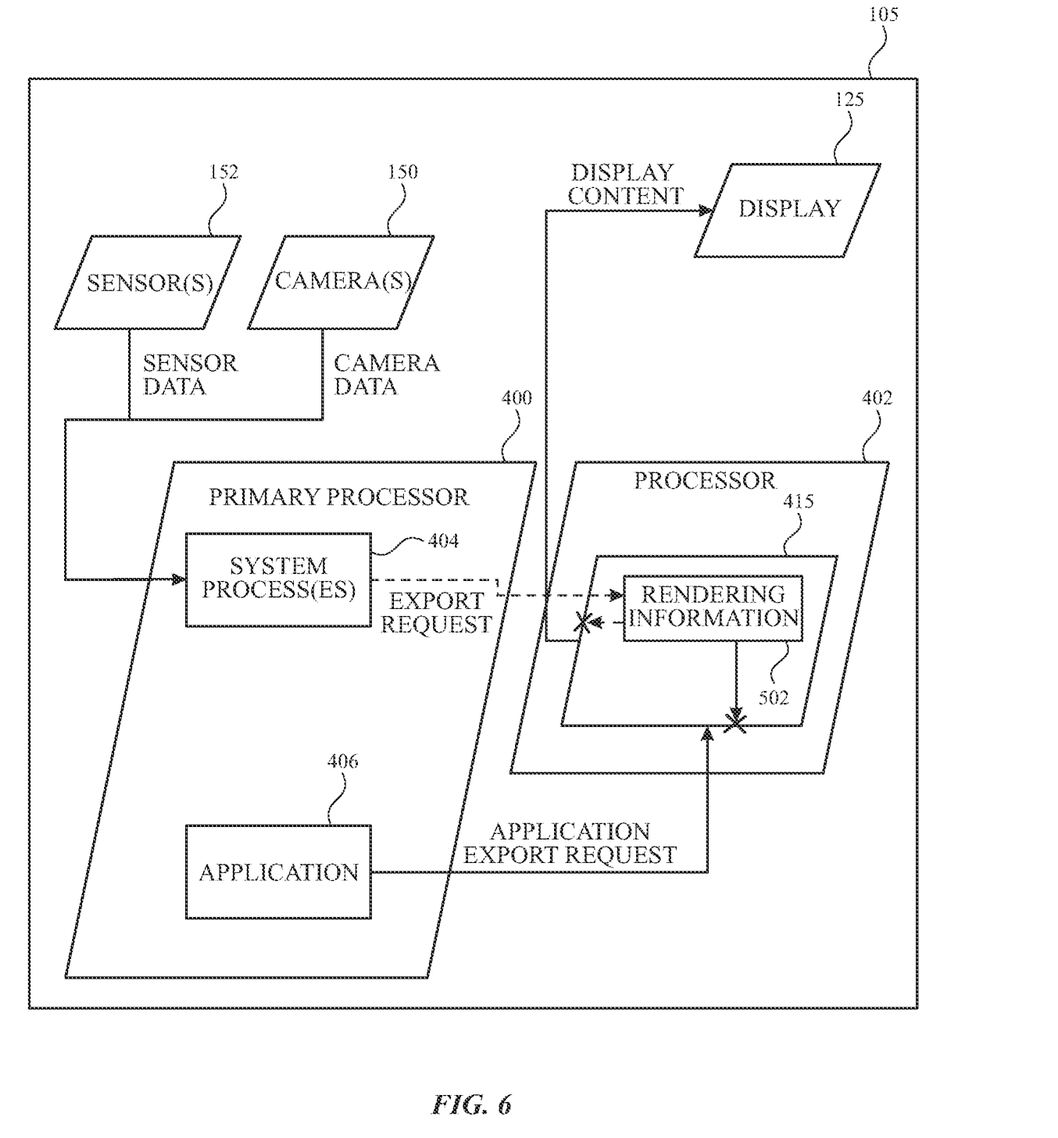
FIG. 6 illustrates an example in which the application of FIG. 5 is prevented from extricating rendering information from a processing environment of a processor other than a primary processor in accordance with one or more implementations.

For example, FIG. 6 illustrates an example of how the rendering information 502, and information derived from the rendering information 502 within the processing environment of the processor 402, may be prevented from being extricated from the processing environment of the processor 402. For example, FIG. 6 illustrates an operating state in which the application 406 provides an application export request, requesting export of the rendering information 502 (e.g., and/or information derived from the rendering information 502). As shown, extrication of the rendering information 502 (e.g., and/or information derived from the rendering information 502) responsive to the application export request is prevented. In the example of FIG. 6, the application export request is illustrated as originating from the application 406 running on the primary processor 400. However, it is appreciated that, even if the application export request is generated from within the processing environment of the processor 402 (e.g., by the execution of the application instructions being executed by the processor 402 to generate the display content), the extrication of the rendering information 502 (e.g., and/or information derived from the rendering information 502) responsive to the application export request is prevented. In the example of FIG. 6, the application export request is illustrated as being provided from the application 406 to the processor 402 and blocked at the processor 402. However, it is also appreciated that the application 406 may attempt to provide the application export request to the processor 402 by providing the request (e.g., via a method call) to one or more of the system process(es) 404 (e.g., a kernel process) running on the primary processor 400, which can intercept the application export request and prevent the application export request from being executed before the request leaves the primary processor 400.

FIG. 6 also illustrates an optional use case in which even the system process(es) 404 that generated the rendering information 502 are prevented from accessing and/or extricating the rendering information 502 (e.g., and/or information derived from the rendering information 502 within the processing environment of the processor 402) from the processing environment of the processor 402. In this example, the system process(es) 404 provide an export request (e.g., to a kernel process of the system process(es) 404 and/or to the processor 402), and the extrication of the rendering information 502 (e.g., and/or information derived from the rendering information 502 within the processing environment of the processor 402) responsive to the export request is prevented. In this way, one or more of the system process(es) 404 may allow the processor 402 to read data from the buffer 422 and write data to the buffer and prevent the primary processor 400 from reading data from the buffer 422.

In one or more implementations, the memory 415 of the processor 402 may be a portion of a shared memory of the electronic device 105 (e.g., portions of which are allocated for the primary processor 400 and other portions of which can be allocated to the processor 402), and the prevention of the extrication of the resolution information from the memory 415 (e.g., from the portion of the shared memory corresponding to the processing environment of the processor 402) can be enforced by a kernel process (e.g., corresponding to one or more of the system process(es) 404) of the electronic device 105. In this way, the kernel process may configure the processing environment to prevent extrication of the rendering information, and information derived from the rendering information within the processing environment, from the processing environment. In one or more implementations, the shared memory may be on-chip memory of a system-on-chip that includes the primary processor 400 and/or the processor 402, and/or may include off-chip memory such as DRAM. In one or more other implementations, the memory 415 of the processor 402 may be dedicated memory of the processor 402 that is physically inaccessible from outside the processor 402.

Figure 7:
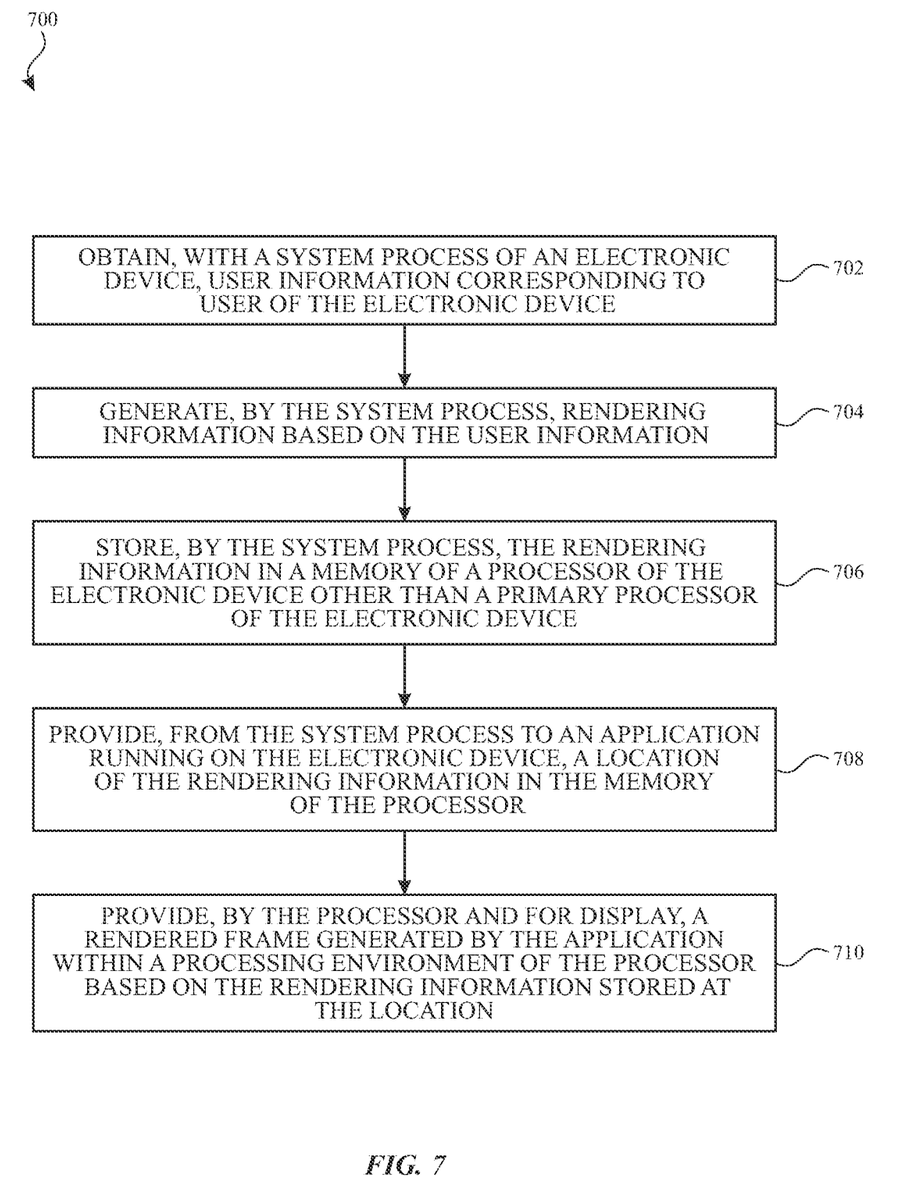
FIG. 7 illustrates a flow diagram of an example process for providing protected access to rendering information according to aspects of the subject technology.

FIG. 7 illustrates a flow diagram of an example process for providing protected access to rendering information according to aspects of the subject technology. The blocks of process 700 are described herein as occurring in serial, or linearly. However, multiple blocks of process 700 may occur in parallel. In addition, the blocks of process 700 need not be performed in the order shown and/or one or more blocks of process 700 need not be performed and/or can be replaced by other operations.

In the example of FIG. 7, at block 702, a system process (e.g., one or more of system process(es) 404) of an electronic device (e.g., electronic device 105) may obtain user information corresponding to a user (e.g., user 101) of the electronic device. In one or more implementations, the user information may include sensor data and/or camera data, and/or information derived from sensor data and/or camera data. For example, in one or more implementations, the user information may include gaze information, such as a gaze location (e.g., gaze location 200) at which a user's gaze is directed on a display (e.g., display 125) of the electronic device. In one or more implementations, the user information may include other user-related information such as head position information, user motion information, user gesture information, or the like.

At block 704, the system process may generate rendering information (e.g., rendering information 502) based on the user information. In one or more implementations, the rendering information may include a resolution map (e.g., resolution map 300) based on the gaze information. For example, the resolution map may include a foveation map (e.g., a VRR map). The rendering information may also, or alternatively, include any other information that is user-specific and that can be used, by a process such as an application, to render a display frame including application content or the generate other user-specific device output.

At block 706, the system process may store the rendering information in a memory (e.g., memory 415) of a processor (e.g., a co-processor such as processor 402) of the electronic device other than a primary processor (e.g., primary processor 400) of the electronic device. In one or more implementations, the processor is configured to allow an application (e.g., application 406) to write an instruction sequence (e.g., application instructions) to the memory of the processor for execution by the processor to generate a rendered frame. For example, the processor may be a graphics processing unit (GPU), in one or more implementations.

At block 708, the system process may provide, to an application (e.g., application 406) running on the electronic device, a location of the rendering information in the memory of the processor. For example, the location may be a memory index of a buffer (e.g., a buffer 422) generated, by the system process, in the memory of the processor. In one or more implementations, the system process allows the processor to read data from the buffer and write data to the buffer and prevents the primary processor from reading data from the buffer. In one or more implementations, the system process may generate a pool of buffers (e.g., a pool 420 of buffers 422) including the buffer in the memory of the processor. In one or more implementations, the system process may also select the buffer, from the pool of buffers, before storing the rendering information in the buffer.

At block 710, the processor may provide for display, a rendered frame generated by the application within a processing environment of the processor based on the rendering information. For example, the rendered frame may include a foveated rendered frame (e.g., as described above in connection with FIG. 2) including application content modified by the application based on the foveation map. In one or more implementations, the processing environment is configured to prevent extrication of the rendering information, and information derived from the rendering information within the processing environment, from the processing environment. The electronic device may also display the rendered frame by a display (e.g., display 125) of the electronic device.

As described above, aspects of the subject technology may include the collection and transfer of data from an application to other users' computing devices. The present disclosure contemplates that in some instances, this collected data may include personal information data that uniquely identifies or can be used to identify a specific person. Such personal information data can include images, sensor data, gaze information, head position and/or characteristic information, motion information, environment information, demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used in generating outputs, such as rendered display frames, for a specific user. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/ sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of generating outputs, such as rendered display frames, for a specific user, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 8:
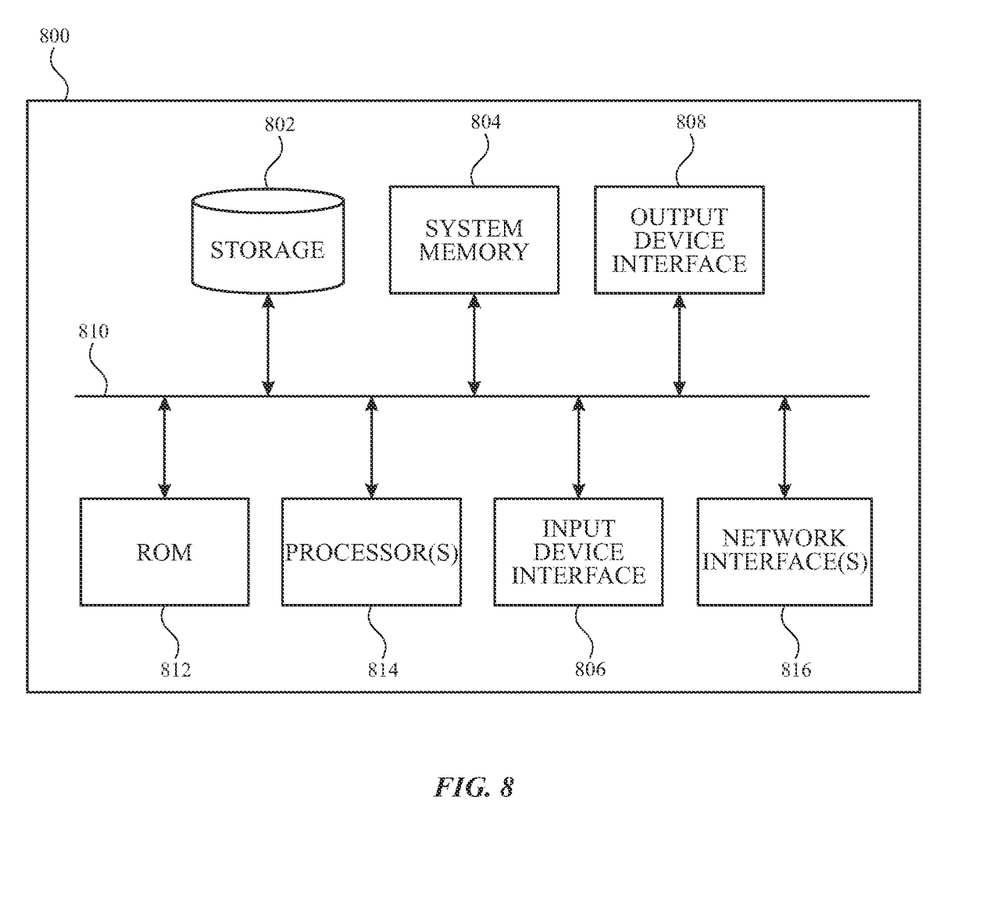
FIG. 8 illustrates an example computing device with which aspects of the subject technology may be implemented.

FIG. 8 illustrates an example computing device with which aspects of the subject technology may be implemented in accordance with one or more implementations. The computing device 800 can be, and/or can be a part of, any computing device or server for generating the features and processes described above, including but not limited to a laptop computer, a smartphone, a tablet device, a wearable device such as a goggles or glasses, and the like. The computing device 800 may include various types of computer readable media and interfaces for various other types of computer readable media. The computing device 800 includes a permanent storage device 802, a system memory 804 (and/or buffer), an input device interface 806, an output device interface 808, a bus 810, a ROM 812, one or more processing unit(s) 814, one or more network interface(s) 816, and/or subsets and variations thereof.

The bus 810 collectively represents all system, peripheral, and chipset buses that communicatively connect the numerous internal devices of the computing device 800. In one or more implementations, the bus 810 communicatively connects the one or more processing unit(s) 814 with the ROM 812, the system memory 804, and the permanent storage device 802. From these various memory units, the one or more processing unit(s) 814 retrieves instructions to execute and data to process in order to execute the processes of the subject disclosure. The one or more processing unit(s) 814 can be a single processor or a multi-core processor in different implementations.

The ROM 812 stores static data and instructions that are needed by the one or more processing unit(s) 814 and other modules of the computing device 800. The permanent storage device 802, on the other hand, may be a read-and-write memory device. The permanent storage device 802 may be a non-volatile memory unit that stores instructions and data even when the computing device 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 814 may need at runtime. In one or more implementations, the processes of the subject disclosure are stored in the system memory 804, the permanent storage device 802, and/or the ROM 812. From these various memory units, the one or more processing unit(s) 814 retrieves instructions to execute and data to process in order to execute the processes of one or more implementations.

The bus 810 also connects to the input and output device interfaces 806 and 808. The input device interface 806 enables a user to communicate information and select commands to the computing device 800. Input devices that may be used with the input device interface 806 may include, for example, alphanumeric keyboards and pointing devices (also called "cursor control devices"). The output device interface 808 may enable, for example, the display of images generated by computing device 800. Output devices that may be used with the output device interface 808 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 810 also couples the computing device 800 to one or more networks and/or to one or more network nodes through the one or more network interface(s) 816. In this manner, the computing device 800 can be a part of a network of computers (such as a LAN, a wide area network ("WAN"), or an Intranet, or a network of networks, such as the Internet. Any or all components of the computing device 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, components, elements, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components (e.g., computer program products) and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   obtaining, with a system process of an electronic device, user information corresponding to a user of the electronic device;
   generating, by the system process, rendering information based on the user information;
   storing, by the system process, the rendering information in a memory of a processor of the electronic device other than a primary processor of the electronic device;
   providing, from the system process to an application running on the electronic device, a location of the rendering information in the memory of the processor; and
   providing, by the processor and for display, a rendered frame generated by the application executing application instructions from within a processing environment of the processor, the application instructions including the location of the rendering information, wherein the rendered frame is generated based on the rendering information stored at the location, further wherein the application is prevented from accessing the rendering information outside the processing environment of the processor.

2. The method of claim 1, wherein the user information comprises gaze information, and wherein the rendering information comprises a resolution map based on the gaze information.

3. The method of claim 2, wherein the resolution map comprises a foveation map and wherein the rendered frame comprises a foveated rendered frame including application content modified by the application based on the foveation map.

4. The method of claim 1, wherein the processor is configured to allow the application to write an instruction sequence to the memory of the processor for execution by the processor to generate the rendered frame.

5. The method of claim 4, wherein the processor is a graphics processing unit.

6. The method of claim 4, wherein the processing environment is configured to prevent extrication of the rendering information, and information derived from the rendering information within the processing environment, from the processing environment.

7. The method of claim 1, wherein the location is a memory index of a buffer generated by the system process in the memory of the processor.

8. The method of claim 7, wherein the system process allows the processor to read data from the buffer and write data to the buffer and prevents the primary processor from reading data from the buffer.

9. The method of claim 8, further comprising generating, by the system process, prior to obtaining the user information, a pool of buffers including the buffer in the memory of the processor.

10. The method of claim 9, further comprising selecting the buffer, after obtaining the user information, from the pool of buffers before storing the rendering information in the buffer.

11. The method of claim 1, wherein the application is prevented from accessing the rendering information by:
   blocking a request to access rendering information outside the processing environment of the processor; or
   intercepting the request to access rendering information outside the processing environment of the processor prior to the request being executed by the primary processor.

12. The method of claim 1, further comprising displaying the rendered frame by a display of the electronic device.

13. A device, comprising:
   a primary processor; and
   a processor other than the primary processor,
   wherein the primary processor is configured to:
      obtain user information corresponding to a user of the device;
      generate rendering information based on the user information;
      store the rendering information in a memory of the processor; and
      provide, to an application running on the device, a location of the rendering information in the memory of the processor; and wherein the processor is configured to:

provide, for display, a rendered frame generated by the application executing application instructions from within a processing environment of the processor, the application instructions including the location of the rendering information, wherein the rendered frame is generated based on the rendering information stored at the location, further wherein the application is prevented from accessing the rendering information outside the processing environment of the processor.

14. The device of claim 13, wherein the user information comprises gaze information, and wherein the rendering information comprises a resolution map based on the gaze information.

15. The device of claim 14, wherein the resolution map comprises a foveation map and wherein the rendered frame comprises a foveated rendered frame including application content modified by the application based on the foveation map.

16. The device of claim 13, wherein the processor is configured to allow the application to write an instruction sequence to the memory of the processor for execution by the processor to generate the rendered frame.

17. The device of claim 16, wherein the processor is a graphics processing unit.

18. The device of claim 16, wherein the processing environment is configured to prevent extrication of the rendering information, and information derived from the rendering information within the processing environment, from the processing environment.

19. The device of claim 13, wherein the location is a memory index of a buffer generated by the primary processor in the memory of the processor, and wherein a system process at the device is configured to allow the processor to read data from the buffer and write data to the buffer, and to prevent the primary processor from reading data from the buffer.

20. The device of claim 19, wherein the primary processor is further configured to:

generate, prior to obtaining the user information, a pool of buffers including the buffer in the memory of the processor; and select the buffer, after obtaining the user information, from the pool of buffers before storing the rendering information in the buffer.

21. A non-transitory computer-readable medium storing instructions which, when executed by one or more processors, cause the one or more processors to perform operations including:

obtaining, with a system process of an electronic device, user information corresponding to a user of the electronic device;

generating, by the system process, rendering information based on the user information;

storing, by the system process, the rendering information in a memory of a processor of the electronic device other than a primary processor of the electronic device;

providing, from the system process to an application running on the electronic device, a location of the rendering information in the memory of the processor; and providing, by the processor and for display, a rendered frame generated by the application executing application instructions from within a processing environment of the processor, the application instructions including the location of the rendering information, wherein the rendered frame is generated based on the rendering information stored at the location, further wherein the application is prevented from accessing the rendering information outside the processing environment of the processor.

* * * * *